United States Patent
Glebov et al.

(10) Patent No.: US 7,092,603 B2
(45) Date of Patent: Aug. 15, 2006

(54) OPTICAL BRIDGE FOR CHIP-TO-BOARD INTERCONNECTION AND METHODS OF FABRICATION

(75) Inventors: Alexei Glebov, San Mateo, CA (US); Kishio Yokouchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 10/791,913

(22) Filed: Mar. 3, 2004

(65) Prior Publication Data

US 2005/0196094 A1 Sep. 8, 2005

(51) Int. Cl.
  G02B 6/26 (2006.01)
  G02B 6/42 (2006.01)
  G02B 6/12 (2006.01)
  G02B 6/10 (2006.01)

(52) U.S. Cl. .................... 385/51; 385/14; 385/31; 385/33; 385/129; 385/130; 385/131

(58) Field of Classification Search .............. 385/14, 385/49, 129–131, 31–33, 51, 34, 43, 88, 385/89, 92, 93
See application file for complete search history.

(56) References Cited

U.S. PATENT DOCUMENTS

| | | | | |
|---|---|---|---|---|
| 5,265,177 A | * | 11/1993 | Cho et al. ............ | 385/14 |
| 6,065,881 A | * | 5/2000 | Okada et al. ........ | 385/88 |
| 6,259,840 B1 | * | 7/2001 | Munoz-Bustamante et al. ...... | 385/39 |
| 6,587,618 B1 | * | 7/2003 | Raguin et al. ...... | 385/33 |
| 6,611,635 B1 | | 8/2003 | Yoshimura et al. ... | 385/14 |
| 6,733,190 B1 | * | 5/2004 | Kuhara et al. ...... | 385/94 |
| 6,834,133 B1 | * | 12/2004 | Towle et al. ....... | 385/14 |
| 6,873,770 B1 | * | 3/2005 | Leung et al. ....... | 385/52 |
| 2004/0184704 A1 | * | 9/2004 | Bakir et al. ........ | 385/14 |

FOREIGN PATENT DOCUMENTS

JP     06-148455     *  5/1994

* cited by examiner

Primary Examiner—Brian Healy
Assistant Examiner—Charlie Peng
(74) Attorney, Agent, or Firm—Sheppard Mullin Richter & Hampton LLP

(57) ABSTRACT

The present invention provides an optical bridge for interconnecting optical networking components and methods of making optical bridges that include a waveguide that are compatible with semiconductor processing steps. The optical bridge of the present invention has less optical losses and is less affected by misalignment that prior art interconnections. The waveguide is formed of a curable optical material that spans optically active areas of two components. In one embodiment of the present invention, one optical component is an optical circuit board and the connected optical component is an electro-optical integrated circuit package containing light emitting or light receiving elements. The method provides a curable optical liquid to the components, bringing the components together to form a continuous optical liquid between the components, and curing the optical liquid.

27 Claims, 6 Drawing Sheets

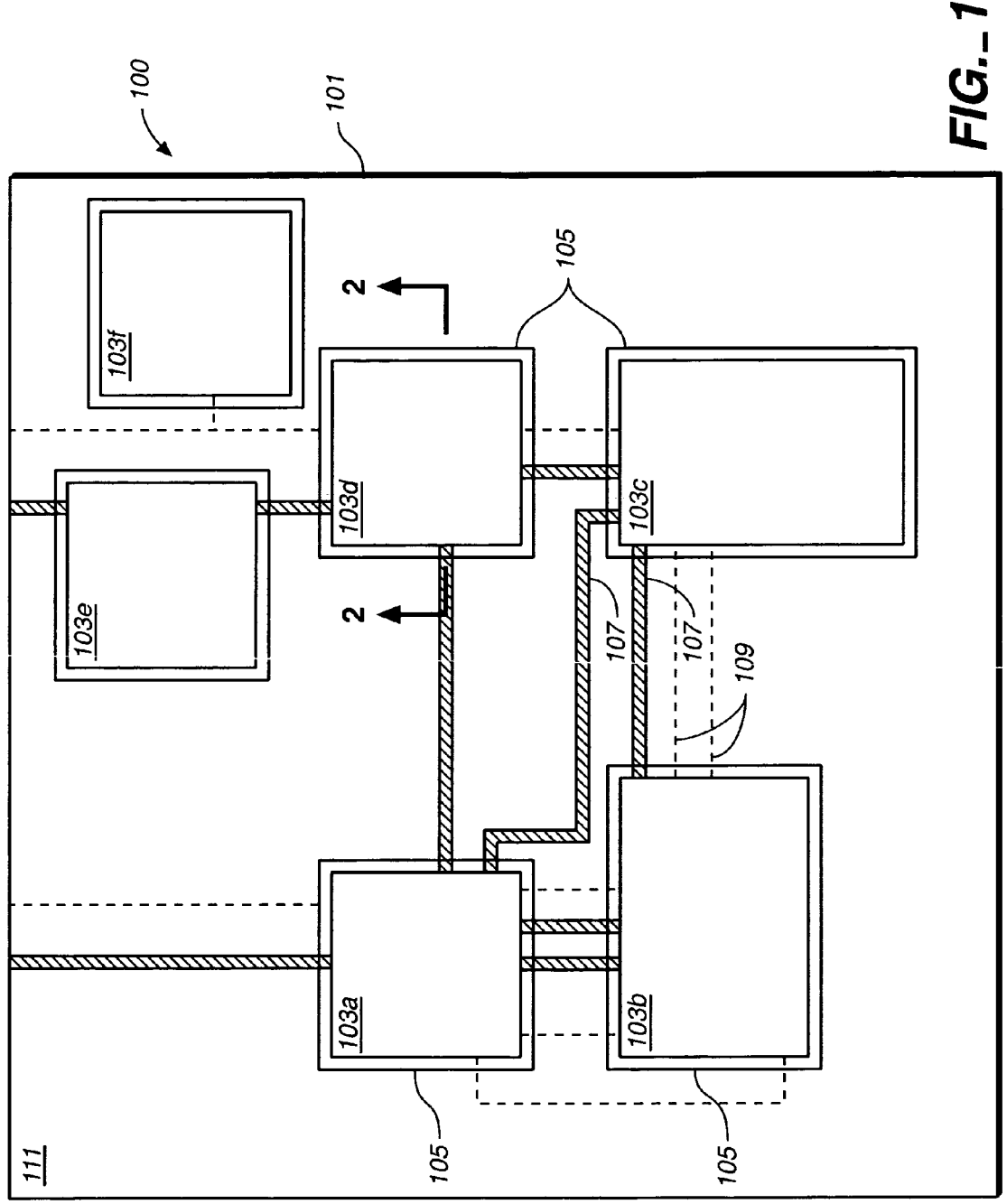
FIG._1

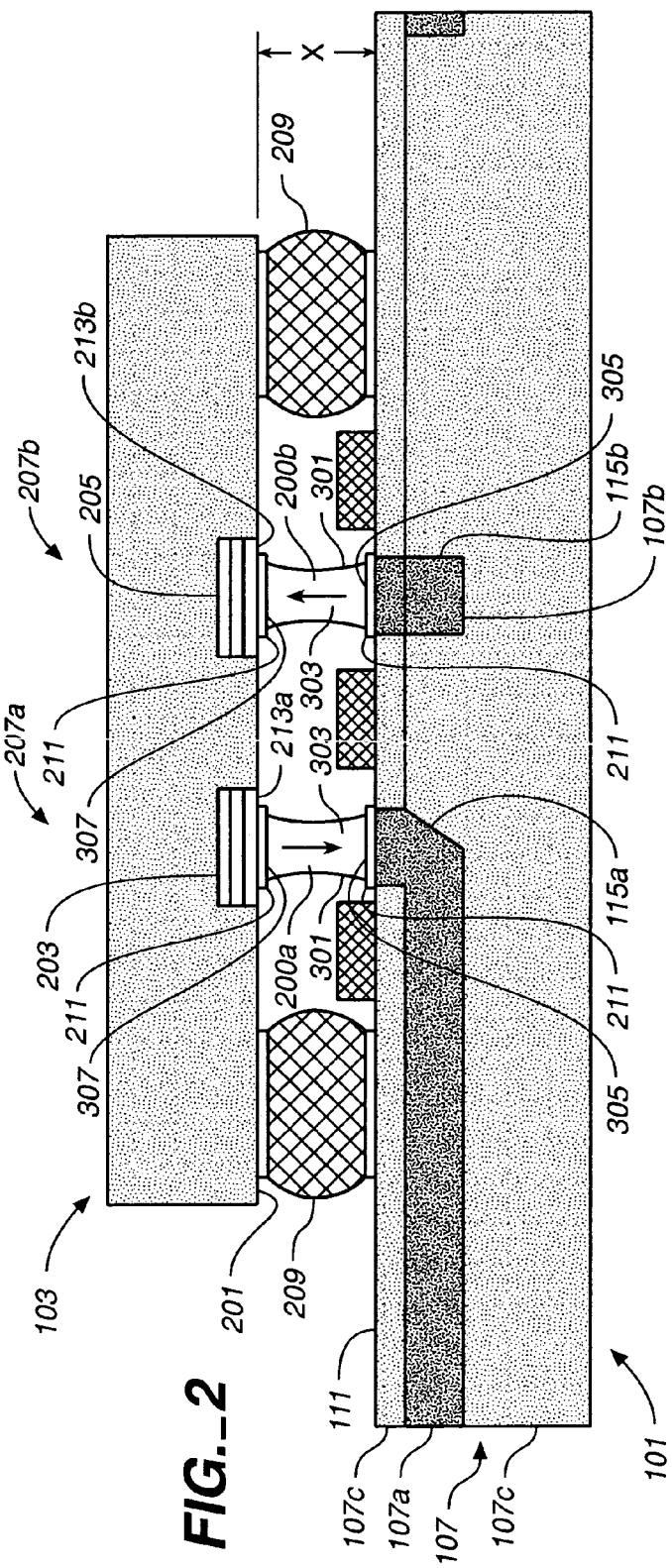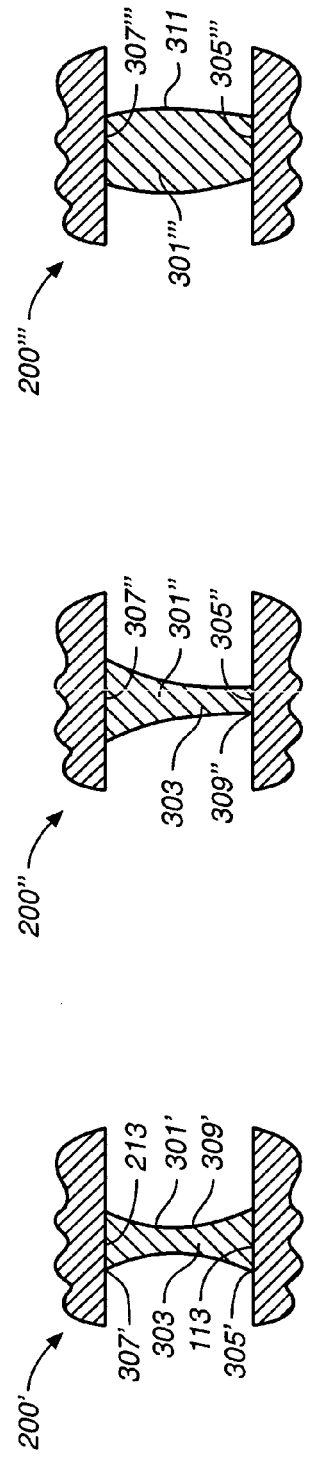

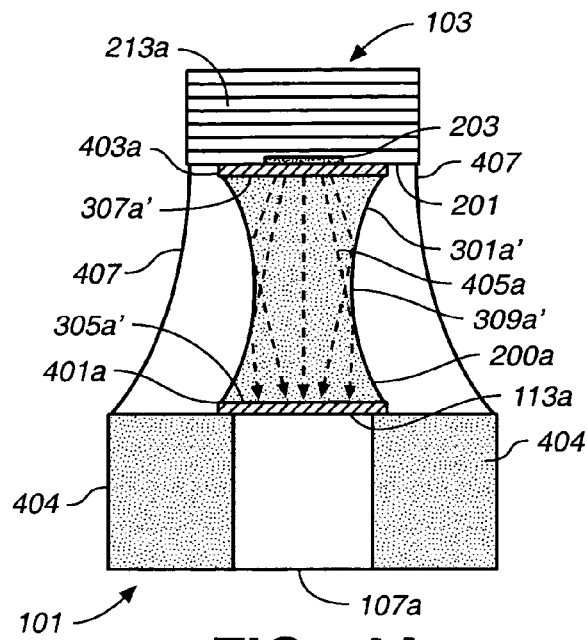
FIG._4A
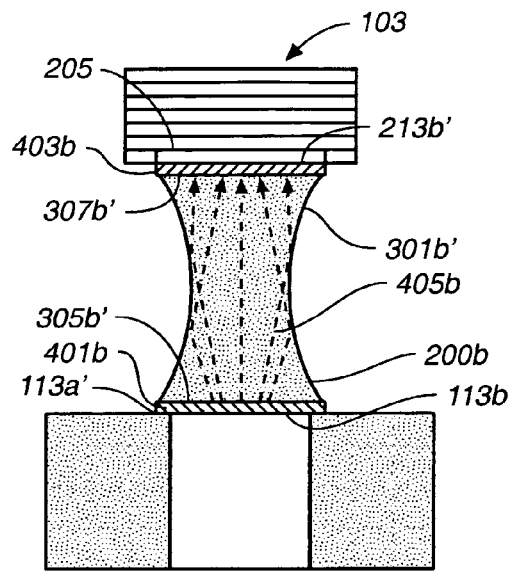
FIG._4B
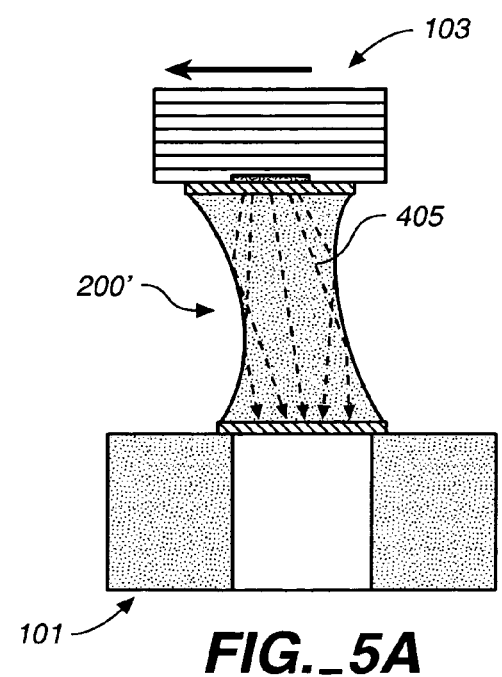
FIG._5A
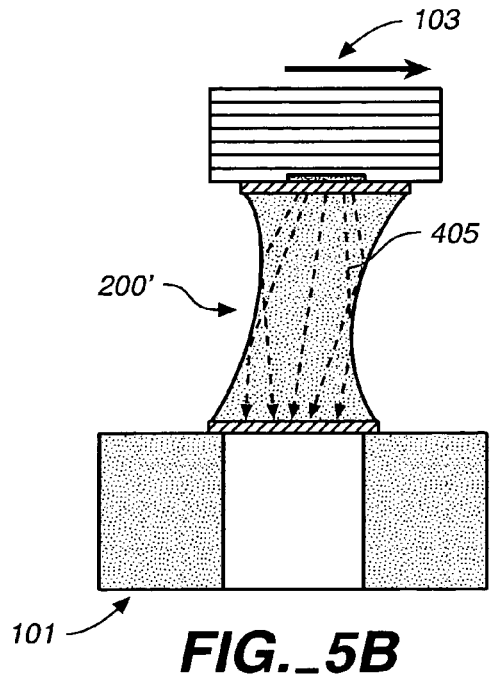
FIG._5B

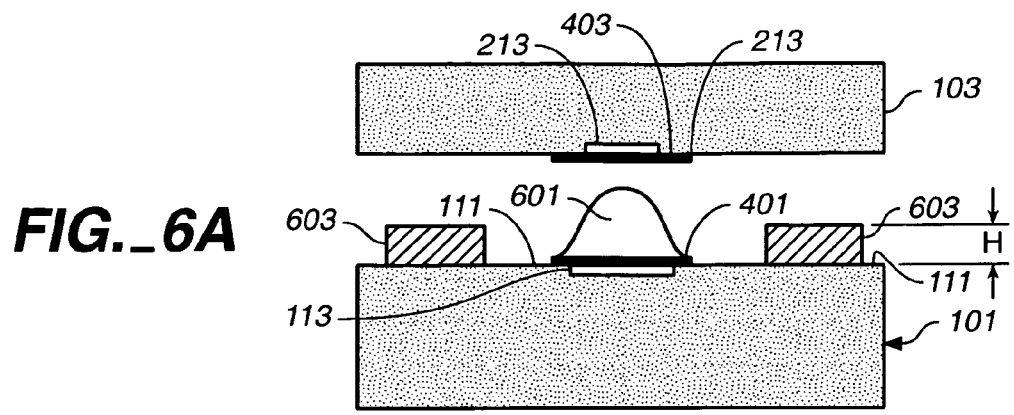
FIG._6A
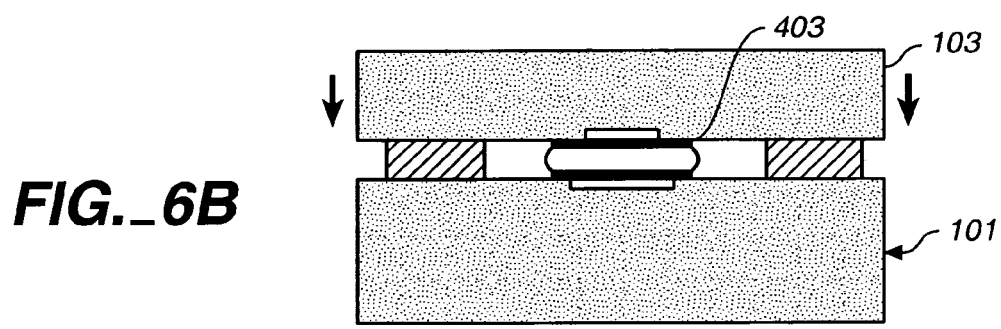
FIG._6B
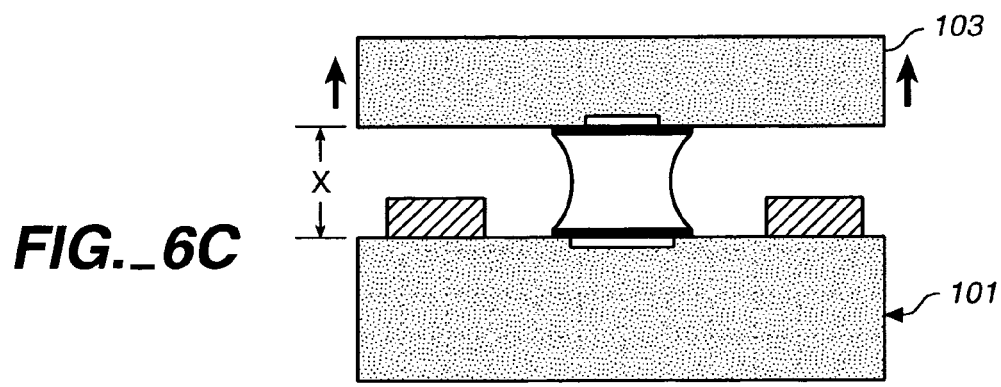
FIG._6C
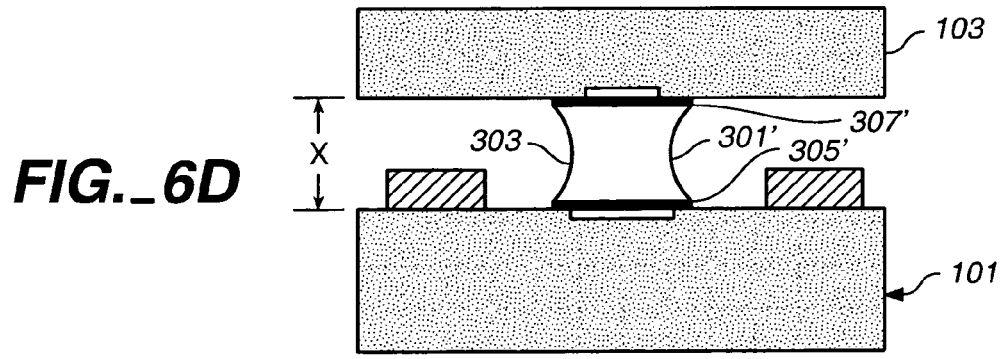
FIG._6D

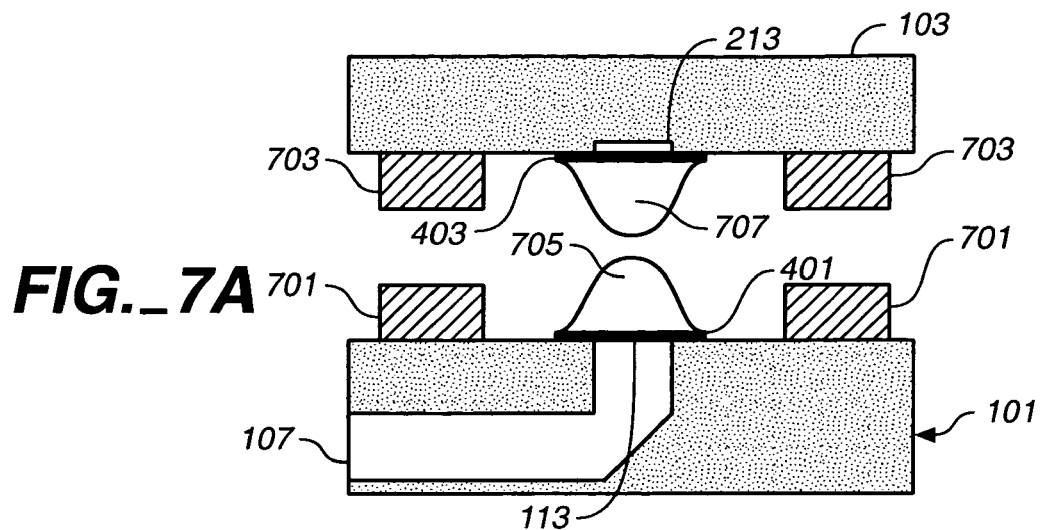
FIG._7A
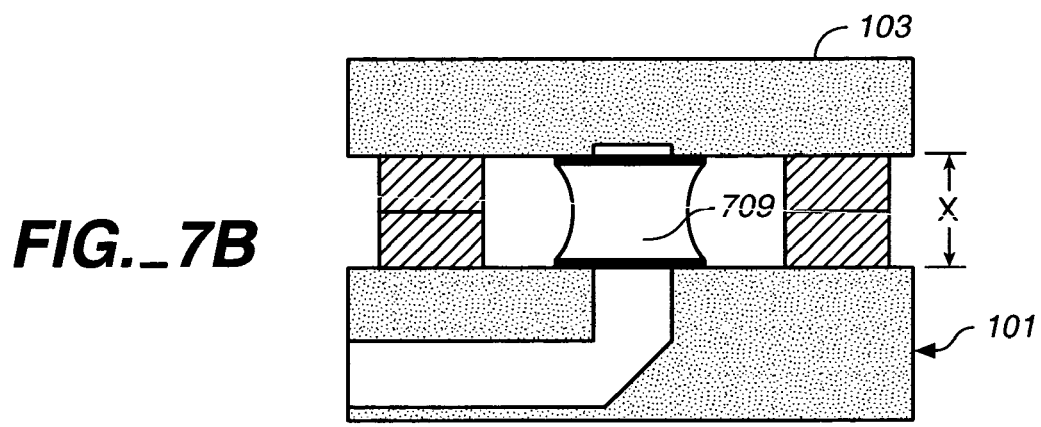
FIG._7B
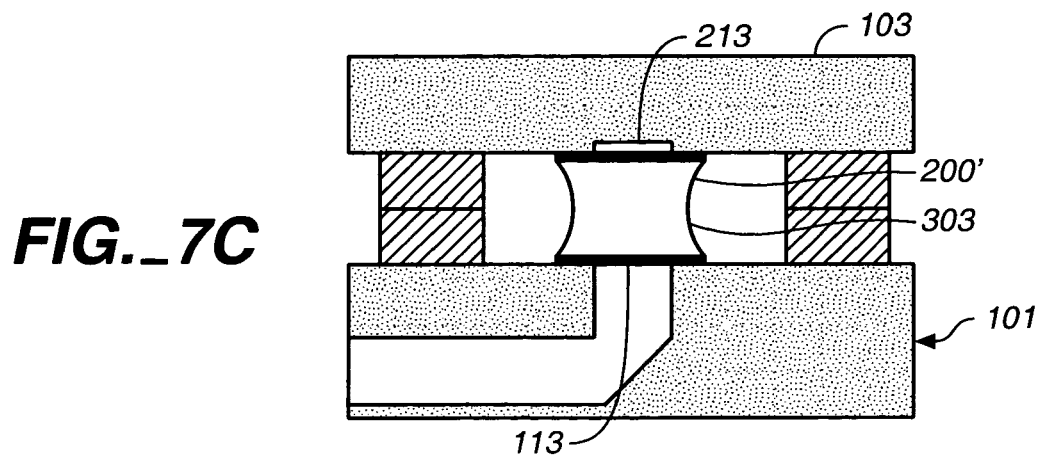
FIG._7C

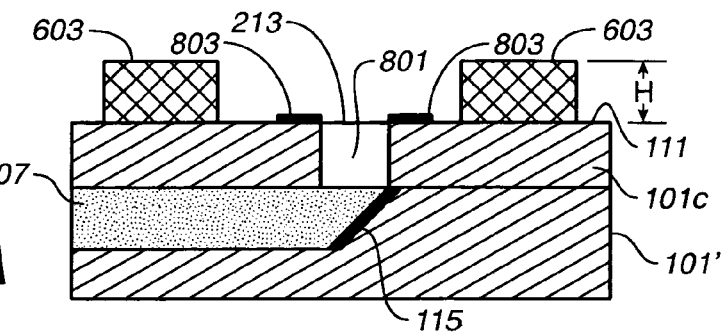
FIG._8A
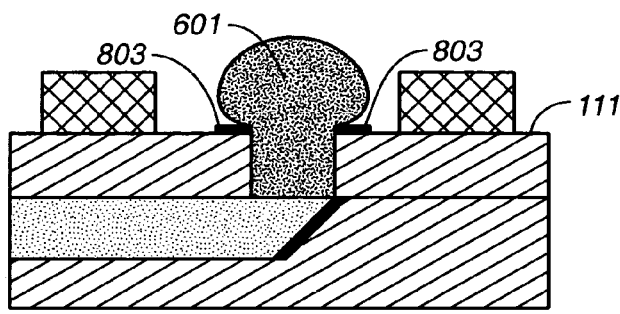
FIG._8B
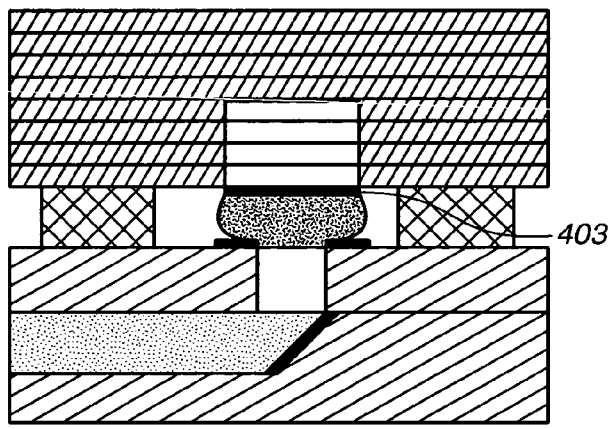
FIG._8C
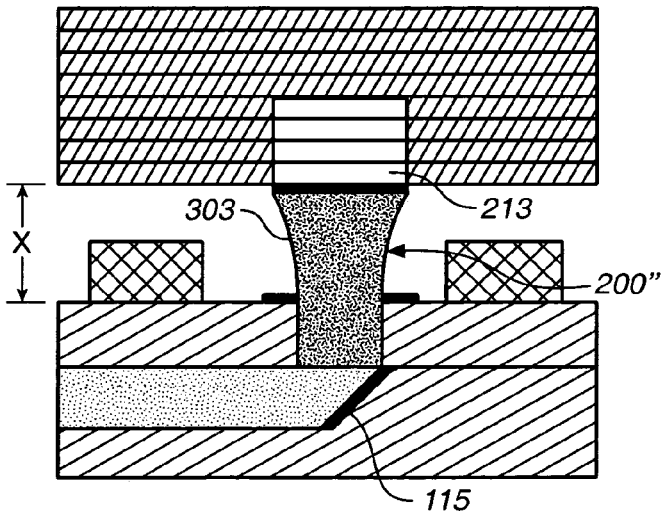
FIG._8D

OPTICAL BRIDGE FOR CHIP-TO-BOARD INTERCONNECTION AND METHODS OF FABRICATION

FIELD OF THE INVENTION

This invention is related to interconnecting optical devices. In particular, the present invention is directed to devices and methods for optically connecting electronic components and optical circuit boards.

BACKGROUND OF THE INVENTION

The growth of networks capable of handling high data-rate transfer of voice and data has created a demand for optical networks. While information can be transferred optically over large distances, there is also a need for interfacing the optical portion of an optical network with electrical and electro-optical components. Thus, for example, optical networks include amplifiers for strengthening optical beams, switches for routing signals, and conversions between electrical and optical signals at either end of the network. These functions are performed by devices that include optical, electro-optical and electrical components.

As with electronic devices, it is advantageous to arrange optical and electro-optical components in a chip-like configuration on a circuit board that allows for interconnection between devices. Numerous methods have been proposed for the interconnection of optical beams of integrated circuit chips. Each of these methods has problems in aligning or having losses in the transmission of the optical beam, or is expensive or difficult to produce or use. Other problems occur when attempting to scale the proposed methods to accommodate a large number of optical beams.

In one system, an electro-optical chip is positioned over a substrate with a ball grid array. An emitter of the chip is aligned with a waveguide on the substrate, and signals are transmitted between the chip and substrate without an intervening material, that is, the interconnection is through free space. Since there is nothing to guide the beam between the components, such a system is susceptible to losses mostly due to component misalignment and the light beam divergence. Lenses can be used to couple the beam between the transmitter and the waveguide as well as between the waveguide and receiver. However, the lenses need to be well aligned with the other components and also have back reflections that results in additional optical power losses. In another system, optoelectronic transmitters and receivers are coupled without wave guiding structures. The emitted light is collimated in beams of 0.5–1 mm size and the holographic optical elements ("HOEs") or other coupling gratings are used to direct optical beams from optoelectronic transmitters directly into receivers located at a relatively large distance, usually more than 10 mm. This type of interconnect has the disadvantage of very difficult alignment procedures as well as of space required for the collimating lenses and thus reduced possibilities for compact integration.

Therefore, it would be desirable to have an optical interconnect and method that are compatible with existing interconnect technology, are relatively insensitive to slight misalignment between the components, have minimal or no optical loss, that prevent particles from interfering with light transmission, and that can be easily scaled to devices that transmit many optical beams. It is also desirable to have an optical connection and method that does not require extensive processing of the chips and that is reliable and relatively inexpensive.

SUMMARY OF THE INVENTION

The present invention provides optical interconnections and methods for providing optical interconnections between optical or electro-optical components and an optical circuit board.

It is one aspect of the present invention is to provide a device and method for optically connecting two components wherein the components are parallel and spaced apart, and separated by an optical polymer.

It is another aspect of the present invention to provide an optical bridge having a lower divergence angle than free-space interconnects.

It is yet another aspect of the present invention to provide an optical bridge that is self-correcting for slight misalignment or movement between components.

It is one aspect of the present invention to provide a waveguide between optically active areas of optical components.

It is another aspect of the present invention to provide an optical bridge that prevents particles from interfering with light transmission between optically active areas of optical components.

It is another aspect of the present invention to provide an optical bridge for communicating between optical components, where light is transmitted between pairs of optically active areas. Each pair of optically active areas includes a first optically active area on a first optical component and a second optically active area on a second optical component in opposed spaced apart relationship to the first optical component. The optical bridge includes one or more waveguides each extending between a corresponding pair of optically active areas and each having an outer surface between the corresponding pair of optically active areas with a concave cross-section. In one embodiment of the present invention, the optical bridge is formed from an optical liquid and comprises a wetting surface of the optical liquid on at least one optically active area of the corresponding pair of optically active areas, with a non-wetting surface surrounding the wetting surface. In another embodiment, the optical bridge further comprises a non-wetting surface of the optical liquid surrounding at least one optically active area of the corresponding pair of optically active areas. Additionally, the waveguide has a boundary at the optically active areas that is equal to or greater than the boundary of the optically active area. For optically active areas that transmit light from the optical component, the waveguide has approximately the same or a larger boundary than the optically active area, and for optically active areas that receive light into the optical component, the waveguide has a boundary approximately equal to the optically active area.

It is yet another aspect of the present invention to provide an apparatus for optically communicating through one or more optically active areas of an optical component to an optical circuit board. The apparatus includes an optical circuit board having a surface comprising at least one optically active area, and one or more optical bridges each including a waveguide. In one embodiment, the waveguide extends between a corresponding pair of optically active areas and has an outer surface between the corresponding pair of optically active areas having a concave cross-section. In another embodiment, the optical bridge is formed from an optical liquid and further comprises a wetting surface of said optical liquid on at least one optically active area of the corresponding pair of optically active areas. In yet another embodiment, the optical bridge further comprises a non-wetting surface surrounding at least one optically active area of the corresponding pair of optically active areas. Additionally, the waveguide has a boundary at the optically active areas that is equal to or greater than the boundary of the optically active area. If one of the optically active areas is a transmitting area, the waveguide has approximately the same or a larger boundary than the optically active area, and if the optically active area is a receiving area, the waveguide has a boundary approximately equal to the optically active area.

It is one aspect of the present invention to provide a method of forming an optical bridge. The method includes: depositing a curable optical liquid on either one or both of a pair of optically active areas including a first optically active area of a first optical component and a second optically active area of a second optical component opposing and spaced apart from the first optical component; aligning the first and second optical components with the pair of optically active areas in an opposing relationship and having a spacing therebetween; adjusting the spacing to where the optical liquid contacts each of the pair of optically active areas; and curing the optical liquid. In one embodiment, the optically active area includes a wetting surface, and the depositing deposits the curable optical liquid on the wetting surface. In another embodiment, one or both optical components include a non-wetting surface surrounding the corresponding optically active area. The method alternatively includes forming a spacing element on one or both of the first and second optical components, and the adjusting step includes contacting the spacing element and the optical components. In another alternative method, the first optical component is an optical waveguide having an embedded waveguide core, and the method includes providing an opening from the first optically active area to the waveguide core and depositing the optical liquid in the opening.

These features, together with the various ancillary provisions and features which will become apparent to those skilled in the art from the following detailed description, are attained by the optical deflecting device, optical switching modules and method of the present invention, preferred embodiments thereof being shown with reference to the accompanying drawings, by way of example only.

BRIEF DESCRIPTION OF DRAWINGS

The foregoing aspects and the attendant advantages of this invention will become more readily apparent by reference to the following detailed description when taken in conjunction with the accompanying drawings wherein:

FIG. 1 is a top plan view of a circuit board having an integrated optical waveguide with optical components mounted thereon;

FIG. 2 is a sectional side view 2—2 of FIG. 1 showing an embodiment of the present invention;

FIGS. 3A, 3B, and 3C are sectional side views showing several embodiments of an optical bridge of the present invention, where FIG. 3A is a first embodiment of an optical bridge having a longitudinal concave shape with a waist between the two bridge ends, FIG. 3B is a second embodiment of an optical bridge having a longitudinal concave shape with a waist at one of the two bridge ends, and FIG. 3C is a third embodiment of an optical bridge having a convex shape;

FIG. 4A is a detailed sectional side view of the first embodiment of an optical bridge of the present invention transmitting light from an optoelectronic integrated circuit ("OEIC") to a circuit board;

FIG. 4B is a detailed sectional side view of the first embodiment of an optical bridge of the present invention transmitting light from a circuit board to an OEIC;

FIGS. 5A and 5B are sectional side views the optical bridge of FIG. 4A illustrating the inherent optical alignment of the optical bridge during two lateral displacements of the optical bridge;

FIGS. 6A, 6B, 6C, and 6D are sectional side views illustrating a method for manufacturing the first embodiment of the optical bridge of the present invention, where FIG. 6A shows a deposited optical liquid on a circuit board, FIG. 6B shows contact between the circuit board and component, FIG. 6C shows the circuit board and component being separated to form the optical bridge, and FIG. 6D shows the optical bridge after curing;

FIGS. 7A, 7B, and 7C are sectional side views illustrating an alternative method for manufacturing the first embodiment of the optical bridge of the present invention, where FIG. 7A shows a deposited optical liquid on a circuit board and opposing component, FIG. 7B shows the circuit board and component contacting, and FIG. 7C shows the optical liquid being UV cured; and FIGS. 8A, 8B, 8C, and 8D are sectional side views illustrating a method for manufacturing the second embodiment of the optical bridge of the present invention, where FIG. 8A shows a the preparation of the circuit board for depositing optical liquid, FIG. 8B shows the deposition of optical liquid on the circuit board, FIG. 8C shows the circuit board and component being contacted, and FIG. 8D shows the circuit board and component separated and cured to form the optical bridge.

Reference symbols are used in the Figures to indicate certain components, aspects or features shown therein, with reference symbols common to more than one Figure indicating like components, aspects or features shown therein.

DETAILED DESCRIPTION

The present invention is directed to devices and methods for providing a waveguide to permit optical communications between optical components, for example between light emitting or light receiving elements and a waveguide of an optical circuit board. In particular, the invention is an "optical bridge" formed of a material positioned between the optical components and arranged to facilitate the exchange of optical signals across the optical bridge as a waveguide. In general, the optical bridges of the present invention include materials, such as optical polymers, which are shaped to facilitate the transmission of optical signals. The optical bridge may either be surrounded by free space, or alternatively may be surrounded by another material, such as an underfill material, that does not interfere with the transmission of light.

Several examples of optical bridges are presented herein as providing a waveguide between an optical component and an optical circuit board on which the component is mounted. This selection of optical components is illustrative and is not meant to limit the scope of the present invention. Optical circuit boards typically include both electrical wiring and embedded waveguide cores for optical communication. One example of an optical circuit board is described in U.S. Pat. No. 6,611,635 to Yoshimura, et al, which is assigned to the assignee of the present application and incorporated herein by reference. The optical bridge of the present invention is in contact with the waveguide core and a component mounted on the board that transmits light, such as light emitting diodes (LED) or vertical cavity surface emitting lasers (VCSEL), or that receives light, such as photodiodes (PD). Alternatively, the optical connection may be between two circuit boards, for example between an optical circuit board and an optical daughterboard, or between transmitting and receiving components. The optical bridges and methods of making optical bridges of the present invention are compatible with methods of forming electrical connections between components and circuit boards, and permits both optical and electrical connections between opposing sides of a component and circuit board, for example in a flip-chip configuration.

Referring now to the figures in combination with the description hereinafter presented, and wherein similar parts of the embodiment of the present invention are identified with like reference numbers, FIG. 1 is a top view of a circuit 100 formed from an optical circuit board 101 on which is mounted integrated circuits including one or more optoelectronic integrated circuit (OEIC) chips 103, and FIG. 2 is a side sectional view 2—2 of FIG. 1 showing optical bridges 200a and 200b, or in general 200. In general, optical circuit board 101 can be a multi-level substrate, such has a multilayer printed circuit board having one or more electrical layers (not shown) and one or more waveguides 107. In addition to OEICs 103 connected to electrical and optical layers, circuit 100 may also include one or more electronic integrated circuit chips that are connected to only the electrical layers of board 101.

Circuit 100 includes OEICs 103a, 103b, 103c, and 103d, which are components that are mounted on and communicate with board 101 by a combination of optically and/or electrical signals. Thus, for example each OEIC 103 may include one or more light sources, such as an LED or VCSEL, and/or one or more light receivers, such as an LED. In general, circuit 100 includes electrical and optical signals, and optical bridge 200 forms an optical path for the light between each OEIC 103 and board 101. For example, a light source, such as an LED or a VCSEL of one OEIC 103 sends an optical signal through optical bridge 200 into board 101. The light signal is then directed to a light receiver, such as a PD, of another OEIC 103.

In addition to the optical connection discussed herein, OEIC 103 is electrically attached to board 101. Electrical connection methods are well known in the art and include, for example, the use of solder bumps, wire-bonding, and conductive adhesive. Thus, for example, board 101 and OEIC 103 may, as shown in FIG. 2, be electrically connected by conductors 209, which can be solders ball, posts or similar structures to provide electrical connections between the board and OEIC, as are known in the art. An underfill or other mechanical support (not shown in FIG. 2) can be provided between board 101 and OEIC 103 for bonding the component to the board. The underfill should have optical properties that do not interfere with optical waveguide 200. In general that implies that the underfill should be optically transparent material, or at least not absorbing, and have a refractive index lower than the polymer used for optical bridge 200.

Thus, for example, an OEIC containing an LED is mechanically attached to the board, is electrically connected to the board to provide power to the LED, and is optically connected to the board to allow light from the LED to pass into a waveguide of the optical circuit board.

The details of optical bridge 200 and the connection to board 101 and OEIC 103 are now presented with reference to FIGS. 1 and 2. Board 101 is a multilayer substrate having, for example, one or more conductors 109, such as conductive layers and vias and the like, for transmitting electrical signals, and one or more optical waveguides 107 for transmitting optical signals. As shown in FIG. 1, components 103 are positioned on top of conductors 109 and waveguides 107 with connections made between the components and one or more of the conductors and waveguides, as necessary. In general, optical bridges 200 are positioned between a pair of optically active areas 207 consisting of an optically active area 113 of surface 111 and an optically active area 213 of surface 201. The term "optically active area" refers to a surface area of a board or component through which light may propagate for optical communication with another board or component.

As is further illustrated in FIG. 2, waveguide 107 includes a first waveguide 107a within the plane of board 101 and a second waveguide 107b perpendicular to the first waveguide and out of the plane of the board. Waveguide 107 is preferably a multimode waveguide having cross-sectional dimensions of 10–100 µm, preferably from 20–50 µm. Each waveguide 107a, 107b is surrounded by a cladding 107c having a refractive index that differs from the waveguide refractive index. Each waveguide 107a, 107b also has a corresponding angled portion 115a, 115b, preferably angled at 45°, for redirecting light between a direction within waveguide 107 and a direction perpendicular to surface 111 and towards optically active area 113a, 113b. Component 103 includes a light emitting sub-component 203 that projects light through optically active area 213a of surface 201, and a light receiving sub-component 205 that accepts light through optically active area 213b of surface 201. The direction of light propagation during optical communication is indicated by the arrows in the corresponding light bridge 200. Surfaces 111 and 201 may include pads 211 on and/or near optically active areas 113 and 213 to aid in forming the shape of the bridges, as described below.

Optical bridge 200 is formed from a material 303 having a surface 301 that acts as a waveguide between optically active areas 113 and 213. As shown in FIG. 2, board 101 has a surface 111 that opposes a surface 201 of component 103. Each surface 111 and 201 has optically active area that forms a pair of optically active areas for optical communication. As illustrated, surface 111 has optically active areas 113a and 113b. As indicated by the arrows in FIG. 2 within optical bridges 200, area 113a receives optical signals and area 113b transmits optical signals. Surface 201 has optically active areas 213, shown as areas 213a and 213b, for light communication with optically active areas 113a and 113b, respectively. FIG. 2 thus shows two pairs of optically active areas: a first pair 207a comprising optically active areas 113a and 213a connected by first optical bridge 200a, and a second pair 207b comprising optically active areas 113b and 213b that are connected by second optical bridge 200b.

In the embodiment of FIG. 2, surfaces 101 and 201 are planar and parallel. Optically active pairs 207 are spaced a distance x apart. The present invention is useful for a wide range of spacing between surfaces 201 and 111. The distance x can be from 10 µm (micron) to 1000 µm, preferably from 50 µm to 150 µm Optical bridge 200 is formed from a material that is optically transparent at the wavelengths used between pairs of optically active areas 207. In general, bridge 200 is formed from a material 303 that defines a surface 301 extending longitudinally between a first end 305 at surface 101 and a second end 307 at surface 201. It is preferred that ends 305 and 307 have boundaries that have at least the same extent as the corresponding surfaces of active areas 113 and 213, respectively. It is preferred that optical bridge is formed from a curable liquid polymer with a refractive index of between the refractive index of waveguide core material 107 and the RI of optically active areas 207 and is surrounded by a gas, such as air, or by another solid material having a lower refractive index than material 303. As described subsequently, the propagation of light between the pair of optically active areas 207 is determined by the shape of surface 301, the size and position of ends 305 and 307 with respect to optically active areas 113 and 213, and the refractive index of bridge 300 and any material surrounding material 303.

As an example of optical bridges of the present invention, several exemplary embodiments are illustrated in FIGS. 3A–3C as a first, second, and third optical bridge of the present invention, 200', 200'', and 200''', respectively. The exemplary embodiments illustrate the optical bridge of the present invention, and are not intended to limit the scope of the present invention. Optical bridge 200' (FIG. 3A) has a surface 301' between first end 305' and second end 307', with a waist 309' midway between the ends. The longitudinal cross-sectional shape of surface 301', as shown in FIG. 3A is concave with a minimum extent at waist 309' and a maximum extent at ends 305' and 307', and the transverse cross-sectional shape (not shown) is approximately circular. The profile of FIG. 3A is a preferred embodiment of the present invention. Ideally, the preferred shape of the optical bridge comprises a cylinder with perfectly straight walls. As a practical matter, it is almost impossible to achieve this preferred shape and, therefore, the inward wall curvature of FIG. 3A is preferred. However, in order not to exclude the straight-walled shape of a cylinder, as used herein the term "concave" is defined to include a wall which has no curvature.

Optical bridge 200'' (FIG. 3B) has a surface 301'' between first end 305'' and a larger second end 307''. Surface 301'' is tapered from second end 307'' to a waist 309'' at first end 305''. The longitudinal cross-sectional shape of surface 301'' is thus concave and tapered from the larger second end 307'' to first end 305''. Optical bridge 200''' (FIG. 3C) has a surface 301''' between first end 305''' and a larger second end 307'''. Surface 301''' is convex between first end 305' and second end 307' with a maximum size at bulge 311. The longitudinal cross-sectional shape of surface 301'' is thus convex.

Optical bridge 200' is now described in more detail with reference to the detailed sectional side view of FIG. 4A, showing optical bridge 200a' which transmits light from OEIC 103 to circuit board 101, and of FIG. 4B, showing optical bridge 200b', which transmits light from the circuit board to OEIC 103. Optical bridges 200a', 200b' include a corresponding bottom pads 401a, 401b over active areas 113a, 113b, top pads 403a, 403b over active areas 213a, 213b, and optical material 303 between the respective top and bottom pads. Pads 401a, 401b, 403a, and 403b are optically transparent, and help control the shape of optical material 303, as described subsequently. As shown in FIG. 4A, optical bridge 200' can be surrounded by an underfill 407 in the space between OEIC 103 and circuit board 101. It is important that the refractive index of underfill 407 is lower than that of optical material 303 and is not absorbing at the operating light wavelength to prevent light leakage and loss from optical bridge 200'. In an alternative embodiment, the shape of material 303 on active areas 113a, 113b, 213a, or 213b can be controlled by placing barriers (not shown) outside of the active areas to prevent the spread of material 303.

Active areas 113a, 113b are at an end of waveguides 107a, 107b, and include a cladding 404 to contain light propagation through the waveguide. Active area 213 can be either the active area of a light transmitting component, such as the output aperture 203 of a VCSEL, or the active area of a light receiving component, such as active area 213b of a PD. Where there a bridge has a specific direction for light propagation, the bridge shape can be tailored to reduce optical losses. Specifically, the transmission of light through an optical bridge is in part determined by the relative size of the ends of the optical bridge and the corresponding optically active areas. For an optically active area that transmits light, the optical bridge end is preferably equal or larger than the optically active area so that all or nearly all of the transmitted light enters the optical bridge. For an optically active area that receives light, the optical bridge end is preferentially approximately equal to the optically active area or smaller so that all or nearly all of the light is received by the optically active area. Thus, for example, the end of the optical bridge that accepts light preferably covers an area equal to or larger than the active area from which light is accepted, and the end of the optical bridge transmitting light preferably has an area equal to or slightly larger than the active area which receives light. The preferred configurations are shown, for example, in FIG. 4A, which shows OEIC 103 having a light transmitting component and having end 307a' larger than active area 203 and end 305a' slightly larger than active area 113a, and in FIG. 4B, which shows OEIC 103 having a light receiving component and having end 307b' corresponding to the shape of active area 213b and end 305b' slightly larger than active area 113b.

FIGS. 5A and 5B are sectional side views of the optical bridge with a displaced OEIC 103. Specifically, FIGS. 5A and 5B shown the effect of laterally translating OEIC 103 from the aligned configuration of FIG. 4A, as indicated by the horizontal arrows of FIGS. 5A and 5B. The lateral translation of FIGS. 5A and 5B can represent a misalignment of OEIC 103 during manufacturing or the displacement as the result of a force to circuit 100. Optical material 303 is preferably a polymeric material that can accommodate some lateral motion. In addition, the deformation of material 303 in response to lateral motion does not appreciably affect the optical performance of optical bridge 200 since the light is guided due to the total internal reflection in the bridge.

The optical bridge of the present invention has many advantages over prior art optical interconnects. Thus, for example, free-space transmission results in typical divergence angles of 10–40°. Due to this strong divergence, there can be large optical losses even across short distances, such as 50 μm to 150 μm. In contrast, optical bridge 200 confines light as it propagates between an OEIC and an optical circuit board, reducing coupling losses. In addition, optical bridge 200 prevents foreign particles from blocking the light path. Also, as shown in FIGS. 5A and 5B the shape of optical bridge 200 can adapt to lateral movements of the component and is self-focusing. Also, the optical bridge material reduces the backreflection losses since its refractive index better matches the refractive indexes of the optically active areas connected by the bridge.

Steps for manufacturing optical bridge 200' from an optical liquid 601 that can be cured to form optical material 303 is shown in the sequence of sectional side views FIGS. 6A–6D, where optically active area 113 is a light receiving surface and optically active area 213 is a light transmitting surface. Examples of optical liquid 601 include, but are not limited to heat-curable or UV light-curable polymers. Prior to the step illustrated in FIG. 6A, pads are formed on board 101 and OEIC 103 to aid in the shaping of optical bridge 200'. Specifically, wetting pad 401 is formed substantially over the optically active area 113 of the light receiving surface, wetting pad 403 is formed over an area equal or larger than the optically active area 213 of the light transmitting surface, and stand-off pads 603 are formed on surface 111. It is preferred that wetting pads 401 and 403 are formed from a material that allows optical liquid 601 to wet the pad, and that surfaces 111 and 201 surrounding the wetting pads are non-wetting surfaces, resulting in optical liquid 601 being confined to the surface of the wetting pads. For example, an optical liquid 601 of optical epoxy or gel wets an optical polymer(epoxy, polyimide etc.) surface and does not wet a metal or oxide dielectric surface. Forming wetting pads 401 and 403 of polymer with surfaces 111 and 201 of metal or oxide causes an epoxy optical liquid 601 to remain over the wetting pads. Alternatively, pads 401 or 403 can be surface finishes that provide appropriate wetting properties.

Thus, for example wetting pads 401 and 403 are optical polymers and are formed on surfaces 111 and 201 by spin coat and lithographic patterning. Stand-off pads 603 are mechanical stops that provide a stand-off height H of from 20 µm to 500 µm between board 101 and OEIC 103 during processing. Pads 603 are formed, for example, from standard polymers used in electronics packaging using the process of e.g., spin coating.

As shown in FIG. 6A, a predetermined amount of optical liquid 601 is dispensed on wetting pad 401 of circuit board 101, and a OEIC 103 having a wetting pad 403 is positioned over the circuit board. Optical liquid 601 is a liquid that, when cured, forms optical material 303. It is important that optical liquid 601 has fluid properties that permit the liquid to wet pads 401 and 403, and not spread onto the surface surrounding the pads.

Next, as shown in FIG. 6B, OEIC 103 and circuit board 101 are moved into contact with pads 401 and 403 aligned. Stand-off pads 603 provide spacing, but allow liquid 601 to contact wetting pad 403. At this point, liquid 601 may extend beyond wetting pads 401 and 403 without wetting the surrounding surfaces. In an alternative embodiment, pads 603 are incorporated onto the surface of OEIC 103.

FIG. 6C shows circuit board 101 and OEIC 103 being separated to a predetermined separation distance X. Liquid 601 remains wetted to pads 401 and 403 during the separation indicated in FIG. 6C, resulting in a concave shape having a waist midway between pads 401 and 403. In the best case the shape of the bridge has perfectly straight sidewalls. However, due to surface tension effects and lack of necessary precision, as a practical matter it is extremely difficult to achieve straight sidewall. Lastly, optical liquid 601 is cured, preferably by heating or UV light exposure, to form optical material 303 of optical bridge 200' as shown in FIG. 6D. The temperature at which optical liquid 601 cures depends on the fluid, and can range from room temperature to an elevated temperature of up to 200° C. maintained for several minutes to many hours.

The shape of optical bridge 200' depends on the amount of optical liquid dispensed between board 101 and OEIC 103, the size of pads 401 and 403, the spacing X, and the change in volume of optical liquid 601 upon curing. An optical bridge 200 having a final bridge height of 100 µm, with top and bottom pads having a diameter of 50 µm, requires about $2\times10^{-4}$ mm$^3$ of optical fluid. To achieve this configuration, the height of the stand-off pad should be in the range of 30–80 µm, depending on the viscosity of the optical material. As noted previously, the transmission of light is increased by having an optical bridge that is larger than the optically active area of the transmitting side and that matches the optically active area of the receiving side.

Alternative steps for manufacturing optical bridge 200' from an optical liquid 709 that can be cured to form optical material 303 are shown in FIGS. 7A–7C. Optical liquid 709 is a UV-curable (or thermally curable), such as UV-curable epoxy or gel, which remains a viscous liquid until exposed to UV radiation, as described below. As shown in FIG. 7A, board 101 has a pair of stand-off pads 701 and OEIC 103 has a pair of stand-off pads 703. Pads 701 and 703 are formed by the methods previously described with reference to FIGS. 6A–6D, and are positioned to oppose each other and cooperate to provide a combined stand-off height H. Before arranging board 101 and OEIC 103 in the opposing position shown in FIG. 7A, the board and OEIC are faced with pads 401 and 403 facing upwards, and predetermined amounts of an optical liquids 705 and 707, which are preferably the same type of liquid, is dispensed on wetting pad 401 and 403, respectively. Board 101 and OEIC 103 are then faced in opposition, as shown in FIG. 7A. The board 101 and OEIC 103 are the moved together as shown in FIG. 7B, allowing optical liquids 705 and 707 to coalesce form a single mass of fluid 709 having a concave shape. Waveguide 107 is provided with UV radiation, indicated by the arrow in FIG. 7C. Waveguide 107 directs the UV radiation upwards and through fluid 709 to cure the fluid and form optical bridge 200'.

Steps for manufacturing optical bridge 200" from an optical liquid 601 that can be cured to form optical material 303 is shown in the sequence of sectional side views FIGS. 8A–8D. Optical bridge 200" extends from a point inside of an optical circuit board 101' to a wetting pad 403 on OEIC 103. Specifically, as shown in FIG. 8A, optical circuit board 101' has a waveguide 107 that terminates at angled portion 115 that has a finish that reflects light 45°, as described previously. As a first step, surface 111 is provided withstand-off pads 603 having height H and optional non-wetting pads 803 surrounding optically active area 113, if necessary. It is preferred that non-wetting pads 803 are formed from a material that prevents optical liquid 601 from wetting the pads. Thus, for example non-wetting pads 803 are metal or oxide and are formed on surface 111 by e.g. sputtering. As a next step, an opening 801 is formed through optically active area 113, into optical circuit board 101' and to angled portion 115. Opening 801 may be formed by etching, laser drilling, or other known techniques.

As shown in FIG. 8B, optical liquid 601 is next dispensed into opening 801 to a height greater than H above surface 111. Non-wetting pads 803 prevent fluid 601 from adhering to the surface beyond optically active area 113. Next, as shown in FIG. 8C, OEIC 103 and circuit board 101' are moved towards one another until OEIC 103 touches stand-off pads 603. The movement of OEIC 103 and circuit board 101' to the point where the spacing is determined by stand-off pads 603 results in fluid 601 contacting wetting pad 403 without wetting the surfaces surrounding the wetting pads. Optionally, stand-off pads 603 are not needed if the motion of OEIC 103 and circuit board 101' during the approach of these components are controlled accurately enough to achieve spacing H.

FIG. 8D shows circuit board 101 and OEIC 103 being separated to a predetermined separation distance X. Fluid 601 extends from angled surface 115 to pad 403 during the separation indicated in FIG. 8D, resulting in a concave shape having a waist near non-wetting pad 803. Lastly, optical liquid 601 is cured to form optical material 303 of optical bridge 200" as shown in FIG. 8D. It is preferred that the refractive index of optical material 303 matches the refractive index of waveguide 107. Optical bridge 200" formed in this way confines the light passing between the light emitting or receiving component of OEIC 103 and waveguide 107 of optical circuit board 101', substantially minimize the coupling loss of light through the optical bridge.

The processes described with reference to FIGS. 6–8 are examples of processes that form one or more optical bridges between the optical components and the optical circuit board. These processes can be applied in parallel with other processes, including but not limited to mechanical attachment techniques such soldering or conductive epoxy bonding.

The present invention thus provides a device and method for connecting two optical components. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. For example, while the present invention describes the use of certain optical polymers, other polymers or combinations of polymers may be used. Accordingly, the disclosures and descriptions herein are intended to be illustrative, but not limiting, of the scope of the invention, which is set forth in the following claims.

What is claimed is:

1. An optical bridge for transmitting light between pairs of optically active areas, each pair of optically active areas including a first optically active area on a first optical component and a second optically active area on a second optical component in opposed spaced apart relationship to said first optical component, comprising:
   one or more waveguides each extending between a corresponding pair of optically active areas,
   where each of said one or more waveguides has an outer surface between said corresponding pair of optically active areas, and where the cross-section of said outer surface in a plane between said corresponding pair of optically active areas is concave, and where each of said one or more waveguides has a smaller diameter near its center than at at least one end thereof.

2. The optical bridge of claim 1, wherein said one or more waveguides is comprises an optical polymer formed from an optical liquid.

3. The optical bridge of claim 2, wherein said optical polymer is curable epoxy or gel.

4. The optical bridge of claim 1, wherein said first optical component and said second optical component are approximately parallel and said separated by a distance of from approximately 10 µm to approximately 1000 µm.

5. The optical bridge of claim 2, further comprising a wetting surface capable of wetting said optical liquid and on at least one optically active area of said corresponding pair of optically active areas, where said wetting surface is surrounded by a non-wetting surface of said optical liquid.

6. The optical bridge of claim 2, further comprising a non-wetting surface capable of not wetting said optical liquid surrounding at least one optically active area of said corresponding pair of optically active areas.

7. The optical bridge of claim 1, wherein at least one of said one or more waveguides has, at said first optically active area, approximately the same boundary as said first optically active area, and has, at said second optically active area, approximately the same boundary as said second optically active area.

8. The optical bridge of claim 1, wherein one of the pair of optically active areas is a transmitting area and wherein the other of the pair of optically active areas is a receiving area, wherein said transmitting transmits light from said transmitting area to said receiving area, wherein said waveguide at said transmitting area has approximately the same boundary or a larger boundary than said transmitting area, and wherein said waveguide at said receiving area has approximately the same boundary as said receiving area.

9. The optical bridge of claim 1, wherein said first optical component is an optical circuit board.

10. The optical bridge of claim 9, wherein said first optical component is a waveguide daughter board.

11. The optical bridge of claim 1, wherein said second optical component includes a photodiode array.

12. The optical bridge of claim 1, wherein said second optical component includes a vertical cavity surface emitting laser.

13. The optical bridge of claim 9, wherein said optical circuit board includes a waveguide core within said first optical component and wherein said waveguide includes a portion between the surface of said first optical component and said waveguide core.

14. The optical bridge of claim 1, wherein said first optical component is mounted on a first substrate and said second optical component is mounted on a second substrate.

15. The optical bridge of claim 14 further comprising a plurality of solder bumps connecting said first and second substrates.

16. An apparatus for optically communicating through one or more optically active areas of an optical component, comprising:
   an optical circuit board having a surface comprising at least one optically active area; and
   one or more optical bridges each including a waveguide each extending between a pair of optically active areas, wherein one of said pair of optically active areas is an optically active area of said optical component and wherein the other of said pair of optically active areas is a corresponding optically active area of said optical circuit board, wherein each of said one or more waveguides has an outer surface between said corresponding pair of optically active areas, and where the cross-section of said outer surface in a plane between said pair of optically active areas is concave, and where each of said one or more waveguides has a smaller diameter near its center than at at least one end thereof.

17. The apparatus for optically communicating of claim 16, wherein said one or more waveguides is an optical polymer formed from an optical liquid.

18. The apparatus for optically communicating of claim 17, wherein said optical liquid is curable epoxy or gel.

19. The apparatus for optically communicating of claim 16, wherein said optical circuit board and said optical component are approximately parallel and said separated by a distance of from approximately 10 µm to approximately 1000 µm.

20. The apparatus for optically communicating of claim 17, further comprising a wetting surface capable of wetting said optical liquid and on at least one optically active area of said pair of optically active areas, where said wetting surface is surrounded by a non-wetting surface of said optical liquid.

21. The apparatus for optically communicating of claim 17, further comprising a non-wetting surface capable of not wetting said optical liquid and surrounding at least one optically active area of said pair of optically active areas.

22. The apparatus for optically communicating of claim 16, wherein at least one of said one or more waveguides has, at said first optically active area, approximately the same boundary as said first optically active area, and has, at said second optically active area, approximately the same boundary as said second optically active area.

23. The apparatus for optically communicating of claim 16, wherein one of the pair of optically active areas is a transmitting area and wherein the other of the pair of optically active areas is a receiving area, wherein said transmitting transmits light from said transmitting area to said receiving area, wherein said waveguide at said transmitting area has approximately the same boundary or a larger boundary than said transmitting area, and wherein said waveguide at said receiving area has approximately the same boundary as said receiving area.

24. The apparatus for optically communicating of claim 16, wherein said optical circuit board is a waveguide daughter board.

25. The apparatus for optically communicating of claim 16, wherein said optical component includes a photodiode array.

26. The apparatus for optically communicating of claim 16, wherein said optical component includes a vertical cavity surface emitting laser.

27. The apparatus for optically communicating of claim 16, wherein said optical circuit board includes a waveguide core and wherein said waveguide includes a portion between the surface of said optical circuit board and said waveguide core.

* * * * *